No. 745,950. Patented December 1, 1903.

UNITED STATES PATENT OFFICE.

JOHN HAZEL YELVINGTON AND JOSEPH EDWARD YELVINGTON, OF NOCATEE, FLORIDA.

INSECTICIDE.

SPECIFICATION forming part of Letters Patent No. 745,950, dated December 1, 1903.

Application filed September 1, 1903. Serial No. 171,576. (No specimens.)

*To all whom it may concern:*

Be it known that we, JOHN HAZEL YELVINGTON and JOSEPH EDWARD YELVINGTON, citizens of the United States, residing at Nocatee, in the county of De Soto and State of Florida, have invented an Improved Insecticide, of which the following is a full and exact specification.

We have produced an improved preparation for destroying insects that infest and injuriously affect fruit-trees, vegetables, and cultivated plants; also, for invigorating such natural products and promoting their growth.

The composition of the preparation is as follows: Take caustic potash, (commercial,) forty pounds; sulfur, thirty pounds; common salt, eight pounds; whale-oil soap, twenty pounds; muriatic acid, (commercial,) one and one-half pints; nitric acid, (commercial,) one and one-half pints; water, forty gallons. The potash, sulfur, salt, and soap are first mixed and boiled until all the solid particles of the ingredients have become thoroughly dissolved. Water is then added in sufficient quantity to cool the solution—say to 100° Fahrenheit. The muriatic and nitric acids are next added, and the liquid mass is well stirred or otherwise agitated to effect thorough intermixture. The remainder of the water is then added and the agitation renewed. It is to be noted that the quantity of water used to form the solution may be varied greatly and much more than the other ingredients, since it is obvious that its function is mainly that of a solution for the chemical substances, and that the strength of the solution ultimately obtained will vary corresponding to the proportion of water added. The solution is then ready for use by application to trees, vegetables, and plants. For this purpose one part of the solution is mixed with forty parts of water—that is to say, one gallon to forty gallons of water. The application may be made in the same way as usual in the case of other liquid insecticides.

The solution has been employed with remarkably successful results, especially on orange-trees, pineapples, tomatoes, egg-plants, and other vegetables. It acts not only as a most efficient insecticide and fungicide, but also invigorates and promotes the healthy growth and development of the trees and plants in a high degree.

What we claim is—

1. The improved insecticide, composed of caustic potash, sulfur, salt, whale-oil soap, muriatic and nitric acid, and water, in substantially the proportions specified.

2. The improved insecticide composed of the following ingredients in the proportions specified, to wit: caustic potash, forty pounds; sulfur, thirty pounds; common salt, eight pounds; whale-oil soap, twenty pounds; muriatic acid and nitric acid, each one and one-half pints; and water in sufficient quantity to produce thorough solution of the soluble constituents named.

JOHN HAZEL YELVINGTON.
JOSEPH EDWARD YELVINGTON.

Witnesses:
C. L. CARLTON,
MARY A. MOYE.